C. WATSON.
CONVEYER.
APPLICATION FILED DEC. 27, 1912.
1,095,441.
Patented May 5, 1914.
2 SHEETS—SHEET 1.
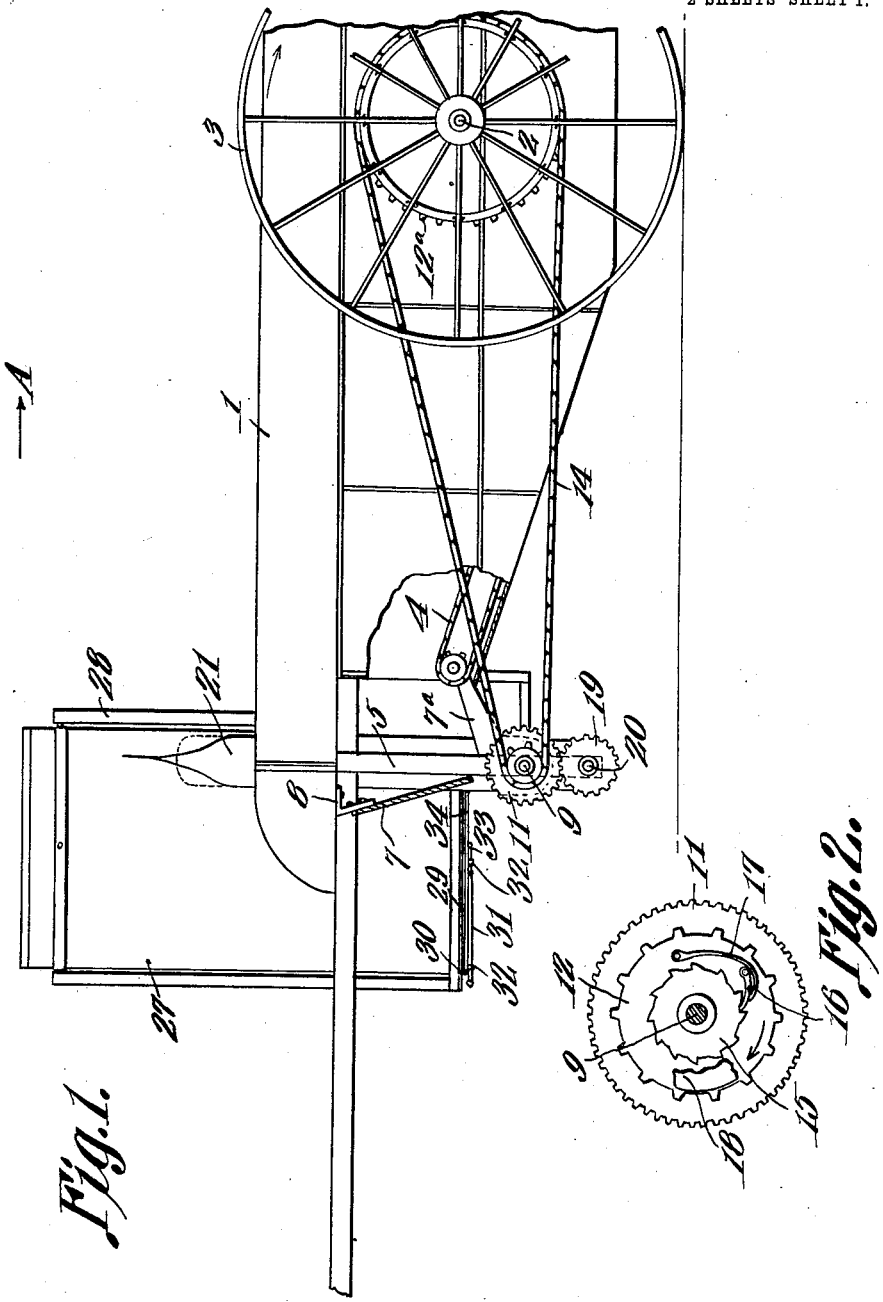
Charles Watson,
Inventor

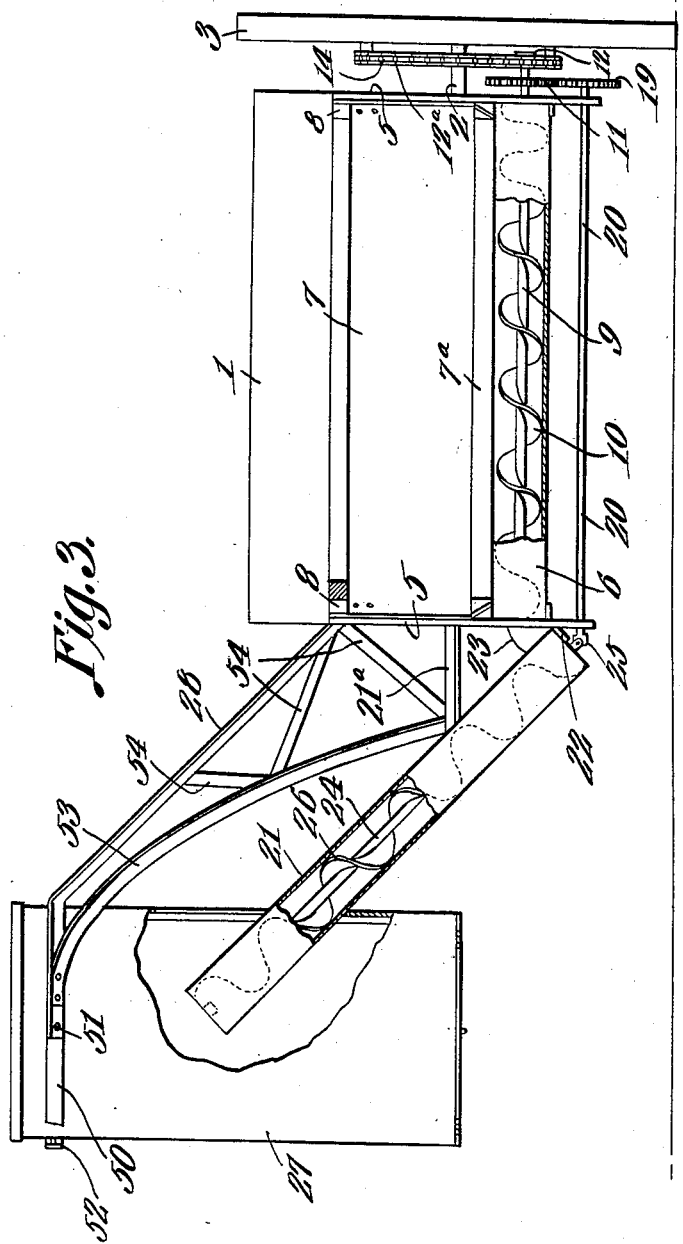

UNITED STATES PATENT OFFICE.

CHARLES WATSON, OF POMEROY, WASHINGTON.

CONVEYER.

1,095,441.   Specification of Letters Patent.   Patented May 5, 1914.

Application filed December 27, 1912. Serial No. 738,951.

*To all whom it may concern:*

Be it known that I, CHARLES WATSON, a citizen of the United States, residing at Pomeroy, in the county of Garfield and State of Washington, have invented a new and useful Conveyer, of which the following is a specification.

The device forming the subject matter of this application is a conveyer, adapted to receive chaff and straw from a combined harvester and header, or like agricultural machine, for the purpose of preventing the chaff and straw from being strewn along the ground as the machine operates.

One object of the present invention is to provide novel means for receiving the straw and for carrying the same horizontally and vertically to a receptacle located to one side of the path traversed by the machine as the same is advanced across the field.

Another object of the invention is to provide novel mechanism for operating the conveyer.

The invention aims, further, to improve generally, and to enhance the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing:—Figure 1 shows, in side elevation, a portion of an agricultural machine of the type above described, the same being equipped with the conveyer forming the subject matter of this application; Fig. 2 is an elevation of clutch mechanism which permits the machine to be backed up without causing a reverse rotation of the conveyer elements; and Fig. 3 is an end elevation of the structure depicted in Fig. 1.

In the drawing, the numeral 1 indicates the body of an agricultural machine, such as a combined harvester and thresher. In order to simplify the drawing, and to avoid a confusion between what is new and what is old, the machine to which the conveyer is attached, has been shown in simple form. Ordinarily, although not necessarily, a body 1 is mounted on an axle 2 carrying a ground wheel 3, the machine being pushed forwardly by the draft animals, or being otherwise propelled, in the direction of the arrow A in Fig. 1. Such a machine includes a conveyer 4, of any improved form, the same in the present instance being shown as a belt conveyer. This conveyer 4 receives the chaff and straw and deposits the same to the rear of the machine, directly in front of the draft animals. The straw and chaff are thus strewn along the ground and are wasted, providing the straw and chaff are not plowed under.

The conveyer mechanism hereinafter described may be supported from the body 1 in any desired manner, and the means for attaching the conveyer mechanism to the body 1 will vary, depending upon the construction of the device wherewith the conveyer is assembled. In the present instance, and by way of illustration, hangers 5 depend from the body 1, hangers 5 supporting a chute 6 which is in the form of a trough, open at the top and co-extensive in length with the width of the conveyer 4. Located above the chute 6 is a baffle plate 7, the function of which is to receive the chaff and straw from the conveyer 4, and to direct the chaff and straw into the chute 6, an inclined deck 7$^a$ being, if desired, interposed between the conveyer 4 and the chute 6 to direct the straw and chaff thereinto. The parts 7 and 7$^a$ may be connected with the body 1 of the machine in any chosen manner, brackets 8, in the present instance, being employed for upholding the baffle 7.

Journaled for rotation in the hangers 5 and extended longitudinally of the chute 6 is a primary shaft 9, carrying an auger 10. A pinion 11 is secured to one end of the primary shaft 9. A sprocket wheel 12 is journaled for rotation on the primary shaft 9, the sprocket wheel 12 being connected by means of a sprocket chain 14 with a sprocket wheel 12$^a$ which is secured to the axle 2 or is connected operatively in any desired manner to the ground wheel 3. Fixed to the shaft 9 is a ratchet wheel 15, engageable by a pawl 16 which is pivoted upon the sprocket wheel 12. The pawl 16 is maintained in engagement with the ratchet wheel 15 by means of a spring 17 which is secured to the sprocket wheel 12. If desired, the ratchet wheel 15, the pawl 16 and the spring 17 may be inclosed within a casing 18, secured to the sprocket 12. The pinion 11 meshes into a pinion 19, secured to one end of a secondary shaft 20 which is journaled in the hangers 5, and is located below the chute 6. Another chute 21 is provided, the same being of tubular form, and being inclined upwardly at an angle of approximately 45°, the chute 21 being located upon the left hand side of the machine. The inner end of the chute 21 may be secured as indicated at 22 to the frame or body of the machine, and a brace 21ª aids in upholding the chute 21. The chute 6 is provided with an extension 23 which discharges into the chute 21. Located within the chute 21 is an auxiliary shaft 24 connected by means of a universal joint 25 with one end of the secondary shaft 20. Located within the chute 21 and carried by the shaft 24 is an auger 26. The outer end of the chute 21 enters a light receptacle 27 which may be fashioned partially from canvas. Braces 28 are connected with the frame of the machine, and a ring 50 surrounds the receptacle 27. The ring is pivoted as indicated at 51 to the outer end of the braces 28, the receptacle 27 being pivoted to the ring 50 as indicated at 52, the pivotal mountings 51 and 52 being rectangularly disposed with respect to each other, to form a gimbal. Auxiliary braces 53 may be connected with the braces 28, the auxiliary braces 53 being connected with the braces 21ª. Counters 54 may connect the braces 53 and 23. A portion 29 of the bottom of the receptacle 27 is hingedly connected with the receptacle as shown at 30. Mechanism of any desired form is provided for holding the hinged section 29 of the bottom in closed position. A locking bolt 31 may be mounted to slide in keepers 32 which are located upon the section 29 of the bottom, the locking bolt 31 being adapted to engage with a keeper 33 carried by the fixed portion 34 of the bottom of the receptacle.

In practical operation, the straw and chaff are delivered rearwardly by the conveyer 4 and pass into the chute 6, the movement of the straw and chaff being directed by means of the baffle 7 and the deck 7ª, the use of these elements, however, being optional. When the chaff and straw pass into the chute 6, the same are engaged by the auger 10 and are advanced through the extension 23 into the chute 21. Within the chute 21, the chaff and straw are engaged by the auger 26 and thereby are deposited in the receptacle 27. When the receptacle 27 has been filled to the desired extent, the bolt 31 may be manipulated, permitting the section 29 of the bottom to swing into an open position, a heap of straw and chaff being thus deposited in an out of the way position, upon the left hand side of the machine. The straw and chaff, thus, are not thrown out in front of the draft animals to be trodden under foot, and are not spread broad cast over the entire field.

The drives are as follows:—When rotatory movement is imparted to the ground wheel 3, motion will be transmitted to the sprocket wheel 12ª, the sprocket wheel 12ª actuating the sprocket chain 14 and the latter actuating the sprocket wheel 12. By means of the ratchet wheel 15, and the pawl 16, the sprocket wheel 12 is operatively connected with the primary shaft 9, so that when the sprocket wheel 12 is rotated, the primary shaft 9 will be rotated. When the primary shaft 9 is rotated, motion will be transmitted to the pinion 11 which is fixed on the primary shaft 9, motion thus being transmitted to the pinion 19 and to the shaft 20, the latter through the medium of the universal joint 25 actuating the shaft 24 and the auger 26.

As will be understood readily, the pawl and ratchet mechanism 15—16 serves to connect the sprocket wheel 12 operatively with the shaft 9 when the ground wheel 3 is rotated in a forward direction. When, however, the ground wheel 3 is rotated in a rearward direction, the pawl 16 will click over the ratchet wheel 15, and consequently, the machine may be backed up without imparting a reverse rotation to the auger 10 and to the auger 26.

It will be observed that owing to the manner in which the catch bag or receptacle 27 is mounted, the same is free to swing and will automatically maintain a vertical position. The foregoing is of importance when the device is operating upon a hill side or upon uneven ground, the operation of dumping the chaff and straw in piles being thereby facilitated.

The device herein disclosed has been shown in a form in which the chaff and straw are conveyed to the left, but it is obvious that the material may be conveyed to the right, by a simple interchange in the position of parts, such interchange involving no invention and lying well within the scope of any skilled mechanic.

Having thus described, the invention, what is claimed is:—

1. In a device of the class described, a vehicle, a frame supported thereby and projecting to one side of the vehicle; a depending, bag-like receptacle extending below the frame and pivotally supported by the frame for universal movement, whereby the receptacle will normally hang in vertical position; means for opening and closing the receptacle and a conveyer mechanism supported by the vehicle, the conveyer mechanism communicating with the receptacle.

2. In a device of the class described, a vehicle; a frame supported thereby and projecting to one side of the vehicle; a support pivoted to the frame for movement in a single plane; a receptacle pivoted to the support for movement in a plane intersecting the plane of movement of the support; means for opening and closing the receptacle; and a conveyer mechanism adapted to receive the material from the vehicle and to deposit the same in the receptacle.

3. In a device of the class described, a vehicle; a frame supported thereby and projecting to one side of the vehicle; a support pivoted to the frame for movement in a single plane; a receptacle pivoted to the support for movement in a plane intersecting the plane of swinging movement of the support, the receptacle including a flexible side wall having an opening; and a conveyer mechanism adapted to receive the frame from the vehicle, the conveyer mechanism projecting into the opening.

4. In a device of the class described, a vehicle; a receptacle supported by the vehicle for universal swinging movement, thereby to permit the receptacle to stand in a vertical position; and a conveyer mechanism carried by the vehicle, the receptacle including a flexible side wall through which a portion of the conveyer mechanism protrudes.

5. In a device of the class described, a vehicle; a depending bag-like receptacle; means for mounting the receptacle on the vehicle for universal swinging movement, whereby the receptacle will maintain a vertical position when the vehicle is operated upon an incline; means for opening and closing the receptacle; and a conveyer discharging into the receptacle.

In testimony that I claim the foregoing as my own, I have hereto affixed my signature in the presence of two witnesses.

CHARLES WATSON.

Witnesses:
W. B. MORRIS,
J. H. BROCKMAN.

Copies of this patent may be obtained for five cents each, by addressing the "Commissioner of Patents. Washington, D. C."